US006996616B1

(12) United States Patent
Leighton et al.

(10) Patent No.: US 6,996,616 B1
(45) Date of Patent: Feb. 7, 2006

(54) HTML DELIVERY FROM EDGE-OF-NETWORK SERVERS IN A CONTENT DELIVERY NETWORK (CDN)

(75) Inventors: F. Thomson Leighton, Newtonville, MA (US); Daniel M. Lewin, deceased, late of Charlestown, MA (US); by Anne E. Lewin, legal representative, Charlestown, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 811 days.

(21) Appl. No.: 09/836,735

(22) Filed: Apr. 17, 2001

Related U.S. Application Data

(60) Provisional application No. 60/197,582, filed on Apr. 17, 2000.

(51) Int. Cl.
*G06F 15/173* (2006.01)
*G06F 9/46* (2006.01)
*G06F 7/00* (2006.01)

(52) U.S. Cl. ............... 709/226; 709/219; 709/235; 718/105; 707/10

(58) Field of Classification Search ........ 709/217–219, 709/223–226, 235, 238; 707/10; 718/105
See application file for complete search history.

(56) References Cited

U.S. PATENT DOCUMENTS

| | | | |
|---|---|---|---|
| 5,924,096 A * | 7/1999 | Draper et al. ............... | 707/10 |
| 6,185,598 B1 * | 2/2001 | Farber et al. ............... | 709/200 |
| 6,249,844 B1 * | 6/2001 | Schloss et al. ............... | 711/122 |
| 6,330,602 B1 * | 12/2001 | Law et al. ............... | 709/224 |
| 6,654,807 B2 * | 11/2003 | Farber et al. ............... | 709/225 |

* cited by examiner

*Primary Examiner*—David Wiley
*Assistant Examiner*—George C. Neurauter, Jr.
(74) *Attorney, Agent, or Firm*—David H. Judson

(57) ABSTRACT

A content delivery network is enhanced to provide for delivery of cacheable markup language content files such as HTML. To support HTML delivery, the content provider provides the CDNSP with an association of the content provider's domain name (e.g., www.customer.com) to an origin server domain name (e.g., html.customer.com) at which one or more default HTML files are published and hosted. The CDNSP provides its customer with a CDNSP-specific domain name. The content provider, or an entity on its behalf, then implements DNS entry aliasing (e.g., a CNAME of the host to the CDNSP-specific domain) so that domain name requests for the host cue the CDN DNS request routing mechanism. This mechanism then identifies a best content server to respond to a request directed to the customer's domain. The CDN content server returns a default HTML file if such file is cached; otherwise, the CDN content server directs a request for the file to the origin server to retrieve the file, after which the file is cached on the CDN content server for subsequent use in servicing other requests. The content provider is also provided with log files of CDNSP-delivered HTML.

6 Claims, 4 Drawing Sheets

HTML DELIVERY FROM EDGE-OF-NETWORK SERVERS IN A CONTENT DELIVERY NETWORK (CDN)

This application is based on and claims priority from Provisional Application Ser. No. 60/197,582, filed Apr. 17, 2000.

BACKGROUND OF THE INVENTION

1. Technical Field

The present invention relates generally to high-performance, fault-tolerant HTTP, streaming media and applications delivery in a content delivery network (CDN).

2. Description of the Related Art

It is well-known to deliver HTTP and streaming media using a content delivery network (CDN). A CDN is a network of geographically distributed content delivery nodes that are arranged for efficient delivery of digital content (e.g., Web content, streaming media and applications) on behalf of third party content providers. A request from a requesting end user for given content is directed to a "best" replica, where "best" usually means that the item is served to the client quickly compared to the time it would take to fetch it from the content provider origin server. An entity that provides a CDN is sometimes referred to as a content delivery network service provider or CDNSP.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet Points of Presence, access points, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

CDNSPs may use content modification to tag content provider content for delivery. Content modification enables a content provider to take direct control over request-routing without the need for specific switching devices or directory services between the requesting clients and the origin server. Typically, content objects are made up of a basic structure that includes references to additional, embedded content objects. Most web pages, for example, consist of an HTML document that contains plain text together with some embedded objects, such as .gif or .jpg images. The embedded objects are referenced using embedded HTML directives, e.g., Uniform Resource Identifiers (URIs). A similar scheme is used for some types of streaming content that may be embedded within an SMIL document. Embedded HTML or SMIL directives tell the client to fetch embedded objects from the origin server. Using a CDN content modification scheme, a content provider can modify references to embedded objects so that the client is told to fetch an embedded object from the best surrogate (instead of from the origin server).

In operation, when a client makes a request for an object that is being served from the CDN, an optimal or "best" edge-based content server is identified. The client browser then makes a request for the content from that server. When the requested object is not available from the identified server, the object may be retrieved from another CDN content server or, failing that, from the origin server. This type of scheme is described in U.S. Pat. No. 6,108,703.

The above-described content delivery network and service provides significant advantages, namely, faster downloads for end-users, reduced load on the home site, flash crowd protection, easier web site management and infrastructure scaling, and the ability to distribute media-rich objects effectively.

It would be desirable to support the delivery of cacheable HTML from a content delivery network such as described above. The present invention provides this functionality.

BRIEF SUMMARY OF THE INVENTION

A content delivery network is enhanced to provide for delivery of cacheable markup language content files such as HTML. To support HTML delivery, the content provider provides the CDNSP with an association of the content provider's domain name (e.g., www.customer.com) to an origin server domain name (e.g., html.customer.com) at which one or more default HTML files are published and hosted. The CDNSP provides its customer with a CDNSP-specific domain name. The content provider, or an entity on its behalf, then implements DNS entry aliasing (e.g., a CNAME of the host to the CDNSP-specific domain) so that domain name requests for the host cue the CDN DNS request routing mechanism. This mechanism then identifies a best content server to respond to a request directed to the customer's domain. The CDN content server returns a default HTML file if such file is cached; otherwise, the CDN content server directs a request for the file to the origin server to retrieve the file, after which the file is cached on the CDN content server for subsequent use in servicing other requests. The content provider is also provided with log files of CDNSP-delivered HTML.

The foregoing has outlined some of the pertinent features and advantages of the present invention. A more complete understanding of the invention is provided in the following Detailed Description of the Preferred Embodiment.

DETAILED DESCRIPTION OF THE PREFERRED EMBODIMENT

Figure 1:
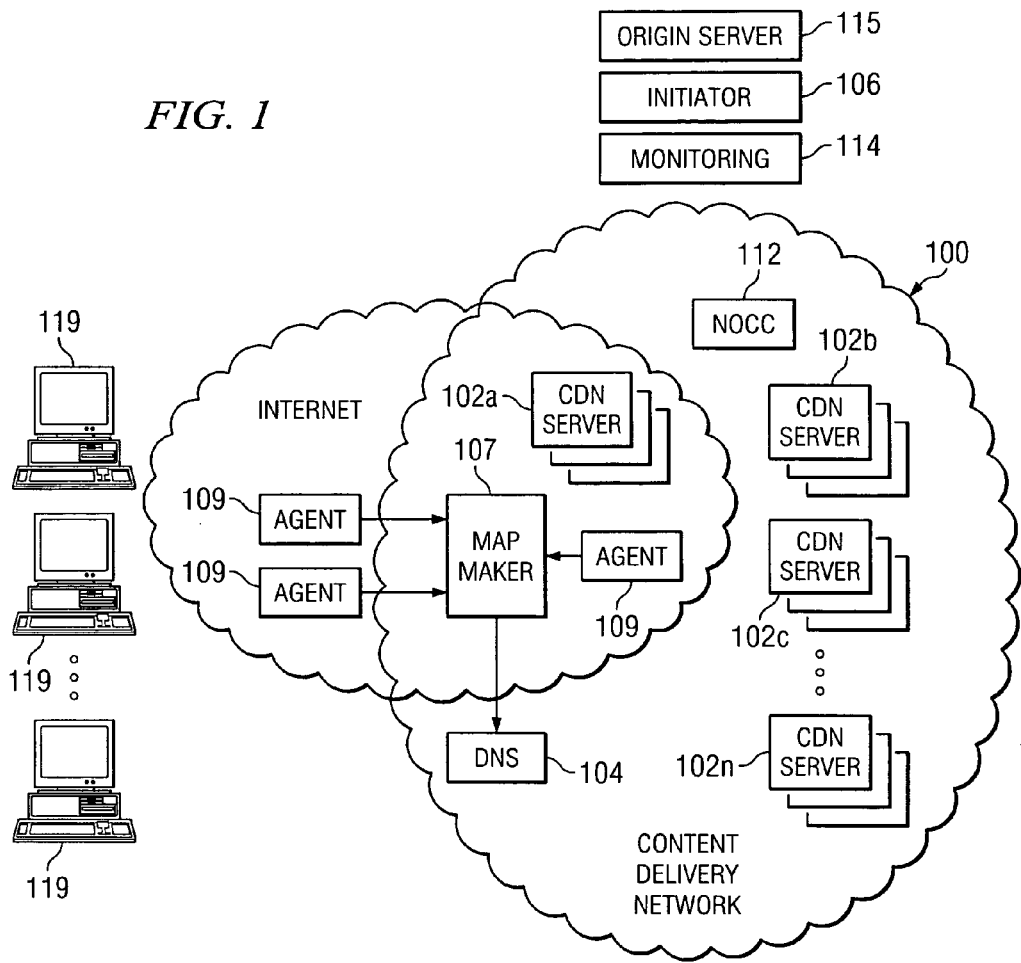
FIG. 1 is a block diagram of a content delivery network in which the present invention may be implemented.

FIG. 1 is a diagram showing one such illustrative content delivery network. The content delivery service comprises a preferably global content delivery network (CDN) 100 of content delivery server regions 102a–n, a domain name service (DNS) system 104, and a content modification or "initiator" tool 106 that allows content to be tagged for inclusion on the network. DNS system 104 receives network mapping data from a map maker 107, which receives inputs from monitoring agents 109 distributed throughout the Internet. Agents typically perform various tests and monitor traffic conditions to identify Internet congestion problems. The map maker 107 takes the data generated from the agents and generates one or more maps detailing Internet traffic conditions. Generally, the content delivery service allows the network of content delivery server regions 102a–n to serve a large number of clients efficiently. Each region may include one or more content servers, with multiple content servers typically sharing a local area network (LAN) backbone. Although not meant to be limiting, a typical server is an Intel Pentium-based caching appliance running the Linux operating system with a large amount of RAM and disk storage. As also seen in FIG. 1, the content delivery service may include a network operations control center (NOCC) 112 for monitoring the network to ensure that key processes are running, systems have not exceeded capacity, and that subsets of content servers (the so-called CDN regions 102) are interacting properly. A content provider operates an origin server (or server farm) 115 from which requesting end users 119 would normally access the content provider's Web site via the Internet. Use of the CDN avoids transit over the Internet for selected content. The content provider may also have access to a monitoring suite 114 that includes tools for both real-time and historic analysis of customer data. One tool is a traffic analyzer, which provides multiple monitoring views that enable quick access to network and customer-specific traffic information. A reporter tool allows for viewing of historical data. A billing tool may be used to generate appropriate billing information for the content provider, who typically pays for the service as a function of the amount of content delivered by the CDN.

High-performance content delivery is provided by directing requests for web objects (e.g., graphics, images, streaming media, HTML and the like) to the content delivery network. In one known technique, known as Akamai Free-Flow content delivery, HTTP and/or streaming media content may be first tagged for delivery by the tool 106, which, for example, may be executed by a content provider at the content provider's web site 115. The initiator tool 106 converts URLs that refer to streaming content to modified resource locators, called ARLs for convenience, so that requests for such media are served preferentially from the CDN instead of the origin server. When an Internet user visit's a CDN customer's site (e.g., origin server 115) and, for example, selects a link to view or hear streaming media, the user's system resolves the domain in the ARL to an IP address. In particular, because the content has been tagged for delivery by the CDN, the URL modification, transparent to the user, cues a dynamic Domain Name Service (dDNS) to query a CDN name server (or hierarchy of name servers) 104 to identify the appropriate media server from which to obtain the stream. A CDN name server is sometimes referred to herein as a surrogate origin server, as it acts authoritatively on behalf of the CP origin servers who contract with the CDNSP. The CDN typically implements a request-routing mechanism (e.g., under the control of maps generated from the monitoring agents 109 and map maker 107) to identify an optimal server for each user at a given moment in time. Further details of a preferred dDNS-based request-routing mechanism are described below.

Metadata is data about the content provider's objects. More specifically, metadata is the set of all control options and parameters that determine how a CDN content server will handle a request for an object. To be handled by a CDN server, preferably all objects have a set of metadata associated with them, such as one or more of the following:

CP Code—an internal tracking number, primarily used for billing;

Serial Number—a CDN-specific value used for load balancing and monitoring;

Origin Server—the location of the original copy of the object, which a CDN server may need to fetch or revalidate the object;

Coherence information—information (e.g., fingerprint, time-to-live (TTL)) about how CDN servers should cache the object and maintain its freshness.

If a content provider uses CP-side content migration, e.g., through an initiator tool, the content provider's URI's are converted into alternate resource locators (ARLs) in the HTML. The ARL's contain all of the required metadata "in-URL" or, as sometimes referred to herein, "in-ARL."

Figure 2:
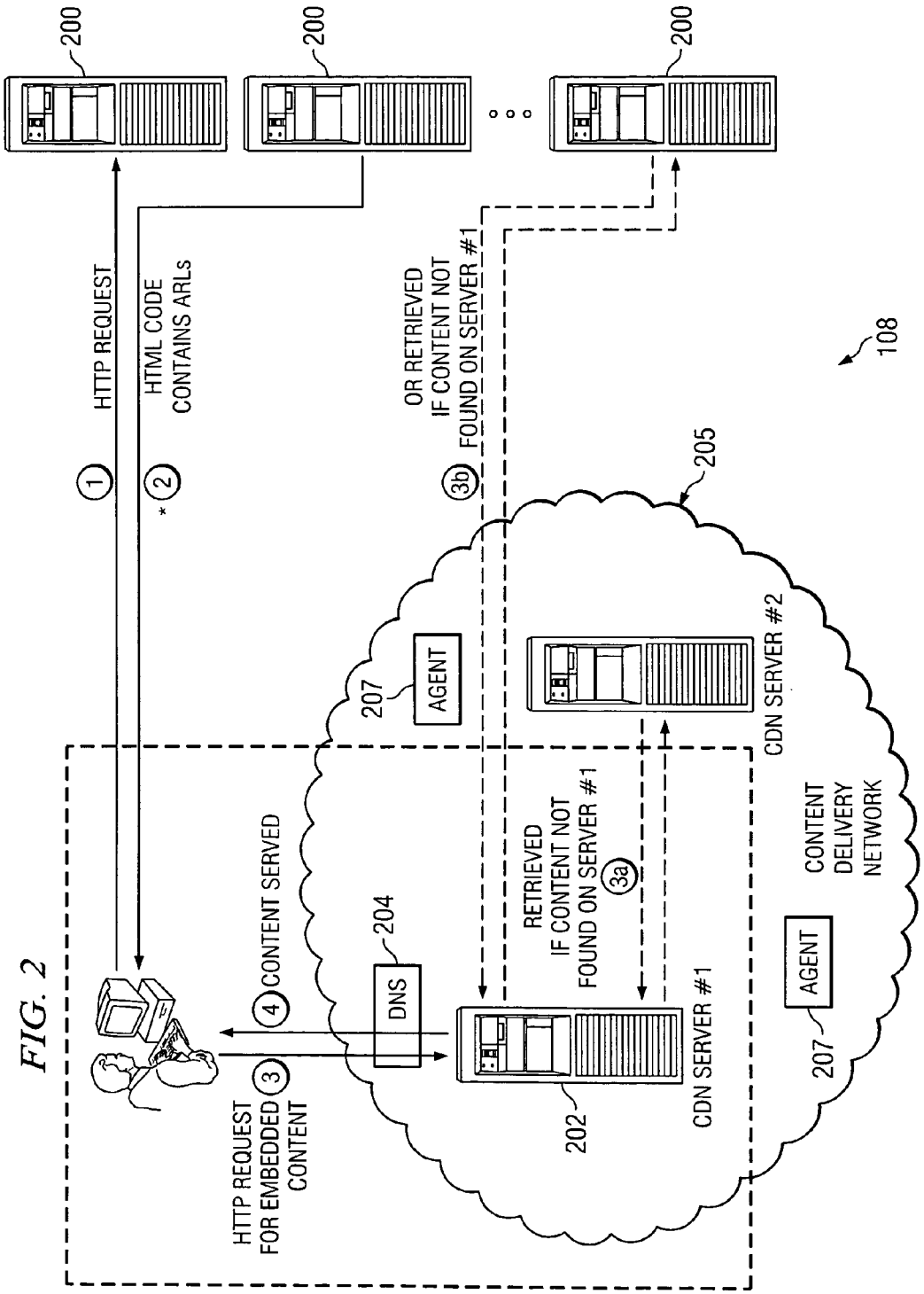
FIG. 2 is a simplified diagram illustrating how a content provider site operates with the content delivery service.
Figure 2A:
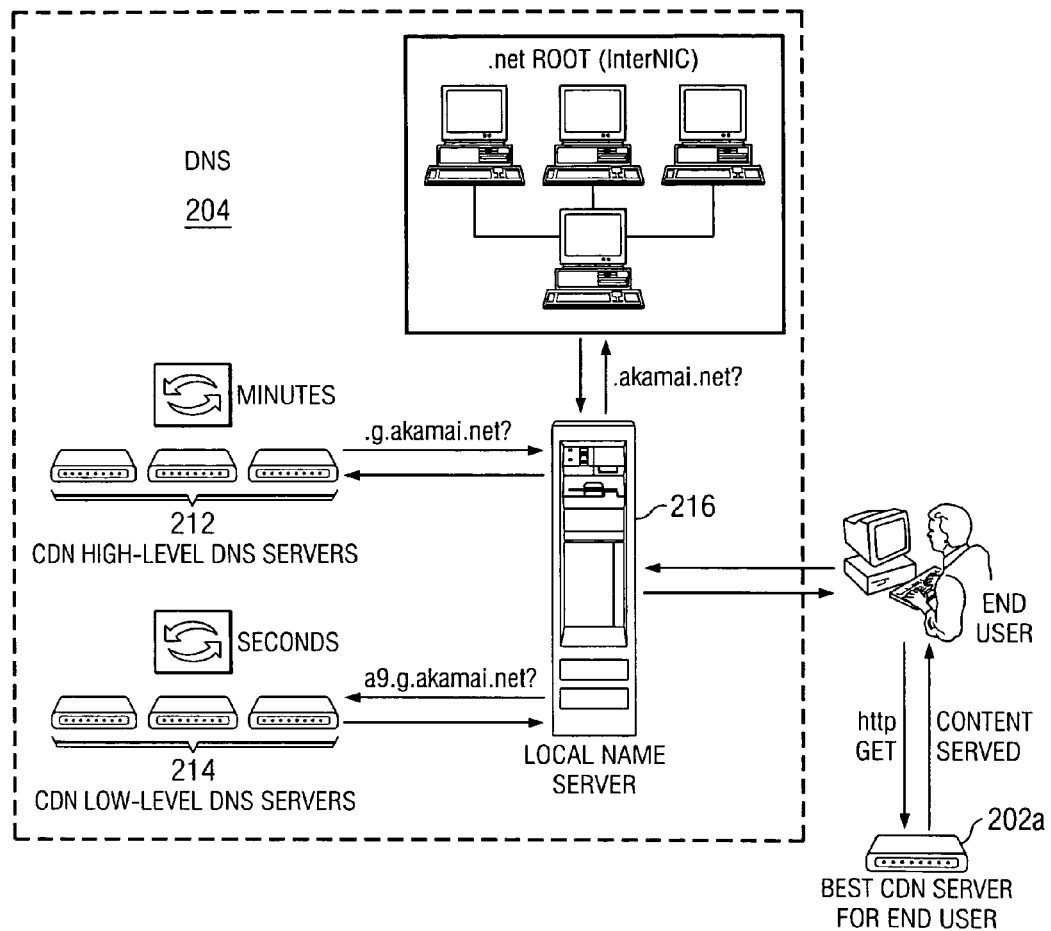
FIG. 2A illustrates how the DNS system resolves a end user request for an ARL.

FIG. 2 illustrates how a Web site 108 operates after given embedded object URLs in a markup language page have been modified to point to the CDN. As illustrated, the content provider's web servers 200 preferably still serve the base HTML page 202. As indicated in FIG. 2A, the dynamic DNS system 204 resolves these ARLs to optimal network servers 202 rather than to the original web servers 200. Specifically, the DNS system 204 ensures that each request for an ARL is directed to the content server, e.g., server 202a, that will most quickly service the request and that is likely to support the requested object. The DNS system 204 preferably comprises a set one or more high level DNS servers 212 that identify a particular region within the content delivery service network 205 to which a given ARL request (e.g., a9.g.akamaitech.net) should be directed. The DNS system 204 also includes a set of one or more low level DNS servers 214 within each such region. Low level DNS is used to identify the particular server 202a that should be the target of the given ARL request. High level DNS server match clients' local name servers (e.g., local name server 216) with the low level DNS servers that can answer their queries most quickly, thus providing clients with fast access to up-to-date server mappings. To that end, mapping agents 207 provide each high level DNS server 212 with a high level map, which is generated every few minutes, that optimally maps IP blocks to sets of low level DNS servers. Each low level DNS server is assigned to direct requests to one region of content servers, usually the region in which the low level DNS server itself resides. In each IP block-to-{set of low level DNS servers} mapping in the high level map, all of the low level DNS servers in the set are assigned to the same region, so it is, in effect, a mapping of IP blocks to server regions. A fast map, which preferably is generated every few seconds, assigns a server region to each low level DNS server. The content delivery service includes appropriate control routines to create the request-to-server mappings that are based on up-to-the-second information on current Internet traffic conditions (derived from the mapping agents). These mappings enable the service to route end-user requests around network problem areas and to deliver content to users in the fastest, most efficient way possible.

According to the present invention, the above-described content delivery network is enhanced to facilitate delivery of cacheable HTML from the edge-of-network servers. Once the HTML is cached at the CDN content servers, it is available for delivery to requesting end users. That HTML may include URLs that have been modified to point to the CDN as described above, but this is not a requirement of the present invention. URLs also may be modified to point to the CDN "on-the-fly," namely, as the HTML is being served to the requesting end user.

For illustrative purposes, it is assumed that the content provider customer configures a default markup language file (e.g., index.html) to retrieve when an end user enters just a hostname (e.g., www.customer.com) in his or her browser. According to the invention, the CDNSP needs to associate requests for www.customer.com with the default HTML file www.customer.com/index.html. Thus, to integrate a content provider site for HTML delivery, the CDNSP must be provided with certain information from the content provider, namely, the domain name of the content provider's origin server. As noted, this identification is needed because, once provisioned, the CDNSP will begin receiving HTTP requests for the content provider's domain name (e.g., www.customer.com) and will need to know where to fetch the content provider's HTML when loading its content servers. In the example illustrated below in FIG. 3, this origin server is html.customer.com. The content provider can provide this information to the CDNSP via a customer extranet or other secure manner. Likewise, the content provider must be provided with the CDNSP-specific domain name (e.g., a820.g.akamai.net) to use for its name servers. As will be seen, the CDNSP-specific domain name is added, e.g., using a CNAME or other name server (NS) DNS entry to facilitate the HTML delivery process by cueing an existing CDN DNS request routing mechanism. One such mechanism is that shown in FIG. 2A (although any one-to-n level DNS hierarchy or other request routing technique may be used for this purpose).

Figure 3:
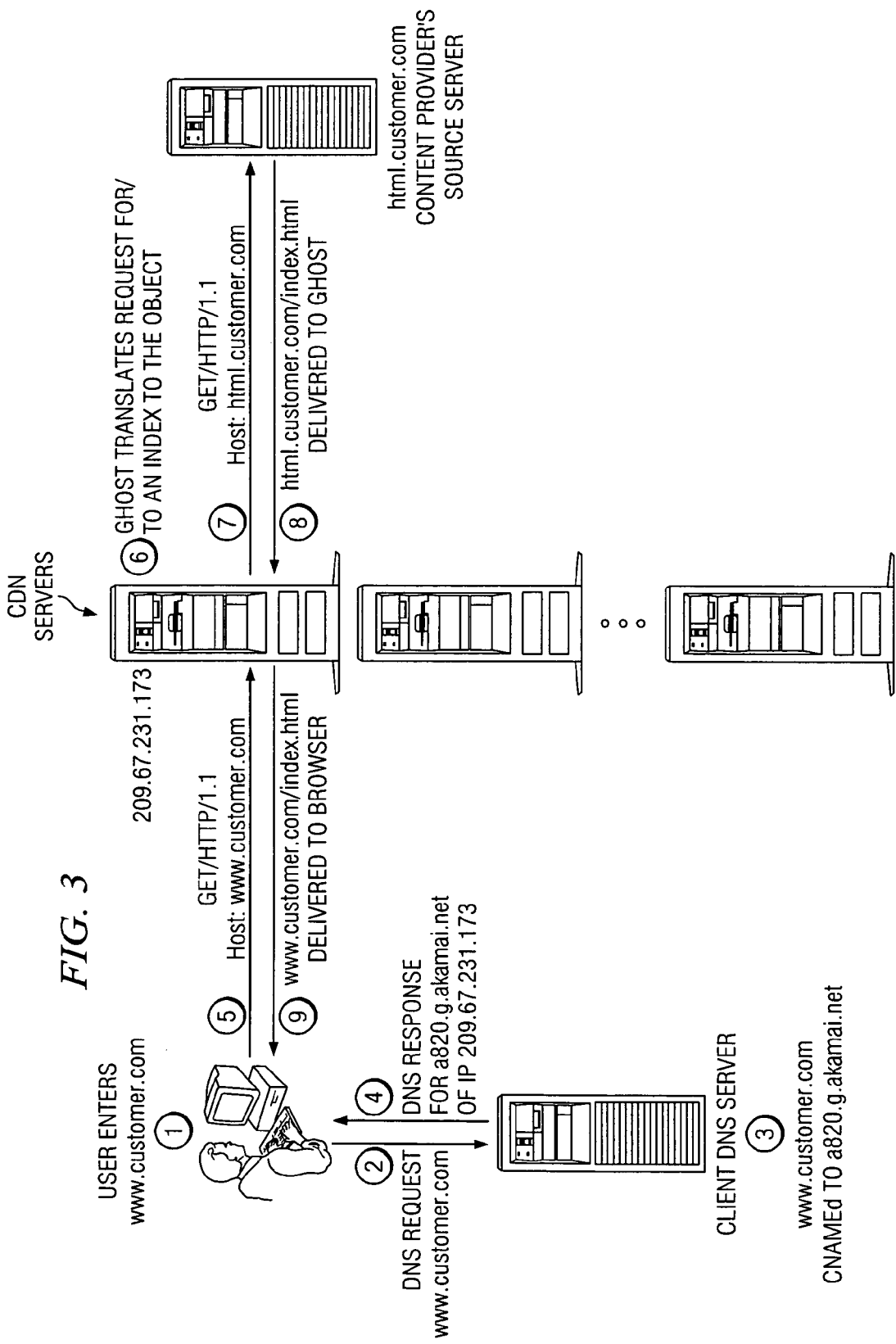
FIG. 3 is a simplified diagram illustrating how cacheable HTML is delivered to and from edge-of-network servers in a content delivery network according to the present invention.

FIG. 3 illustrates and describes, at a high level, how an HTML page such as index.html (or, more generally, any markup language such as XML, HDML, WML, or the like) is provisioned for delivery to the CDN content servers and ultimately to requesting end users. For simplicity, this process is described from the viewpoint of a requesting end user.

1. The user enters a URL in a browser, for example http://www.customer.com.
2. The end user client browser makes a DNS request for http://www.customer.com to the content provider's DNS server or to some other name server that is authoritative for the customer.com domain.
3. The DNS server looks up http://www.customer.com, and, according to the present invention, finds that there is CNAME (or other name server (NS)) entry to the content delivery network, e.g. a820.g.akamai.net. A CNAME is an alias to a server's name. In this example, the customer's domain is CNAMEd to a CDNSP-specific domain that points to and is managed by the CDNSP. At this point forward, the content delivery is managed by the CDN on behalf of its content provider customer.
4. By applying dDNS as described above (by way of example only), an IP address (for a820.g.akamai.net) is returned to the browser, either from a CDN LLDNS server, or from a cached entry from the browser's configured DNS server. In this example, a820.g.akamai.net resolves to 209.67.231.173.
5. The client browser then makes an HTTP request to IP address 209.67.231.173 for the server root "/", and includes the host header in the HTTP header. For example:
   GET/HTTP/1.1
   Host: www.customer.com
6. The edge server (global host or "ghost") translates the request for/to an index to the object in the cache (i.e., a cache object identifier). Preferably, the index will include metadata and other information that was otherwise located in-ARL, such as content provider (CP) code and the identity of the content provider's origin server to use when loading the cache. The following illustrates a technique for how the edge server may accomplish this, although the implementation may vary:
   a. The server looks up a content provider (CP) code for host www.customer.com, and finds it to be, e.g., "32";
   b. The server builds an index to the object in the cache. During this process, the CDN server identifies the content provider's origin server (e.g., "html.customer.com") to use when loading the cache. This information is provided by the content provider to the CDNSP during the integration process as described above.
7. If there is an entry for the file on the edge server, this entry is returned to the requesting end user if its time-to-live (TTL) has not expired. If there is no entry for the file on the edge server (or if there is an expired entry), the server will make a request for the server root from the content provider's origin server, html.customer.com
8. The html.customer.com origin server returns a file, in this case index.html, to the edge server. The server catches this file for future requests for http://www.customer.com/
9. The index.html file is delivered to the browser to complete the HTML delivery. Embedded objects for the page may then be fetched using the content delivery network in the usual manner.

Preferably, the content delivery network includes a logging and reporting mechanism to provide the content provider with real-time and historical information about the content served. According to the present invention, preferably the content provider is also provided information about the HTML served from the edge servers. In a preferred embodiment, the CDN has the ability to keep a single log file of the content provider's HTML hits in approximate real-time. The mechanism preferably provides content providers with real-time statistics, segmented by geo-location, of HTML traffic on the network, which may include, e.g., real-time counts of page views, visitors/unique users, and the like. Historical reporting of such information may also be provided. Log delivery also may include information such as cookie data, referrer data, user agent data, content-type data, and the like.

As described above, the content provider publishes an authoritative copy of the HTML as a default file. In the example above, the copy was index.html. To facilitate delivery, the content provider and/or the CDNSP must also publish "metadata" to the CDN content servers that enable the servers to associate a given host (e.g. www.customer.com) with particular content metadata that determines how the server will handle a request for the object. As a result, when the CDN content server receives a GET request, for example, it examines the host information in the host header against a host rewrite rule (e.g., provided by the content provider) to identify the given metadata that is to be associated with the content. A metadata transmission system may be used to securely publish metadata out to the edge servers for the host rewrite rules. Further details of such techniques are described in Ser. No. 09/835,663, filed Apr. 16, 2001, titled "Content Delivery Network (CDN) Content Server Request Mechanism With Metadata Framework Support," which is assigned to the assignee of this application.

The above-described technique facilitates the delivery of HTML and embedded content from the content delivery network. In summary, to support HTML delivery on the CDN, the content provider provides the CDNSP with the association of the content provider's domain name (www.customer.com) to the origin server domain name that hosts one or more default HTML files. The CDNSP provides its customer with a CDNSP-specific domain name. The content provider, or an entity on its behalf, then implements DNS entry aliasing (e.g., CNAME the host to the CDNSP-specific domain) so that requests for the host cue the CDN DNS request routing mechanism. The content provider is also provided with access to log files of CDNSP-delivered HTML.

In an alternate embodiment, HTML may be delivered from the origin server to the edge server initially, or from the edge server to the requesting browser, in a compressed format. HTML transport compression reduces bandwidth requirements.

Figure 4:
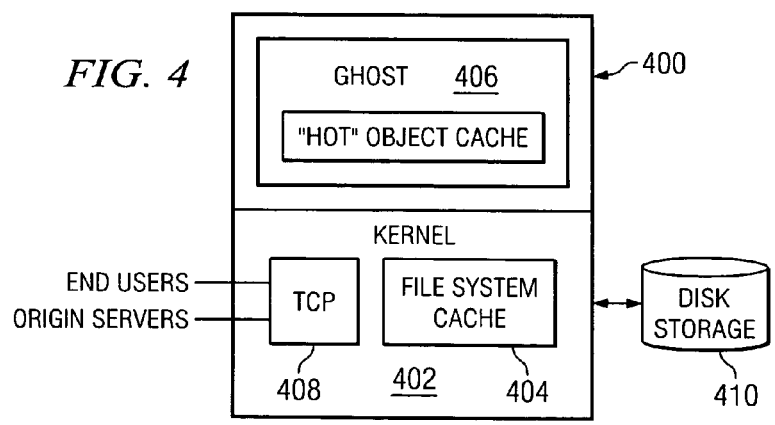
FIG. 4 is a block diagram of a CDN content server.

FIG. 4 illustrates a typical machine configuration for a CDN content or "edge" server. Typically, the content server 400 is a Pentium-based caching appliance running an operating system kernel 402 (e.g., based on Linux), a file system cache 404, CDN global host (or "ghost") software 406, TCP connection manager 408, and disk storage 410. CDN ghost software 406 is useful to create a "hot" object cache 412 for popular objects being served by the CDN. In operation, the content server 400 receives end user requests for content, determines whether the requested object is present in the hot object cache or the disk storage, serves the requested object via HTTP (if it is present) or establishes a connection to another content server or an origin server to attempt to retrieve the requested object upon a cache miss. Ghost software 406 includes appropriate code (i.e., a set of program instructions) for implementing the functionality described above and illustrated in FIG. 3.

Having thus described our invention, what we claim is set forth below.

What is claimed is:

1. A method operative in a content delivery network (CDN) wherein participating content providers identify content to be served from a set of CDN content servers in response to requests that are resolved through a request routing mechanism, comprising:

associating a content provider domain with a domain of an origin server at which the content provider hosts a default markup language file;

associating, during resolution, the content provider domain with a CDNSP-specific domain;

responsive to an end-user request directed to the content provider domain, using the CDNSP-specific domain to cue the request routing mechanism to identify a CDN content server;

determining whether a given version of the default markup language file exists on the identified CDN content server; and if the given version of the default markup language file exists on the identified CDN content server, serving the default markup language file to the requesting end user; and if the given version of the default markup language file does not exist on the identified CDN content server, directing a request for the default markup language file to the origin server, receiving the requested default markup language file at the identified CDN content server, building an index for the default markup language file that includes information about the origin server, caching the requested default markup language file at the identified CDN content server for selectively serving the default markup language file to the requesting end-user using the index, and logging data about the requested default markup language file served to the requesting end-user.

2. The method as described in claim 1 wherein the content provider domain is associated with a CDNSP-specific domain by DNS entry aliasing.

3. The method as described in claim 2 wherein the DNS entry aliasing is a CNAME entry in a name server that is authoritative for the content provider domain.

4. The method as described in claim 1 wherein the markup language file is HTML.

5. The method as described in claim 1 wherein the default markup language file is served from the origin server to the CDN content server in a compressed form.

6. The method as described in claim 1 wherein the default markup language file is served from the CDN content server to the requesting end user in a compressed form.

* * * * *